United States Patent
Woods et al.

(10) Patent No.: US 12,391,399 B1
(45) Date of Patent: Aug. 19, 2025

(54) TEMPORARY BACK-SHELL COVER FOR AN AIRCRAFT FUEL TANK

(71) Applicant: Government of the United States, as represented by the Secretary of the Air Force, Wright-Patterson AFB, OH (US)

(72) Inventors: Richard Woods, Litchfield, AZ (US); Michael Williamson, Peoria, AZ (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 40 days.

(21) Appl. No.: 18/500,532

(22) Filed: Nov. 2, 2023

Related U.S. Application Data (60) Provisional application No. 63/585,644, filed on Sep. 27, 2023.

(51) Int. Cl.
*B64D 37/32* (2006.01)
*B64F 5/60* (2017.01)

(52) U.S. Cl.
CPC ............... *B64D 37/32* (2013.01); *B64F 5/60* (2017.01)

(58) Field of Classification Search
CPC ...... B64D 30/00; B64D 30/005; B64D 30/02; B64D 30/04; B64D 30/06; B64D 30/32; B64D 2037/325; B64F 5/00; B64F 5/30; B64F 5/40; B64F 5/45; B64F 5/60
See application file for complete search history.

(56) References Cited

U.S. PATENT DOCUMENTS

| | | | |
|---|---|---|---|
| 6,213,101 B1* | 4/2001 | Numbers | F02M 37/103 174/151 |
| 10,040,568 B2* | 8/2018 | Rebbeck | B64D 45/02 |
| 11,723,469 B2* | 8/2023 | Fowler | A47C 9/00 297/452.48 |
| 2005/0034781 A1* | 2/2005 | Rodousakis | B64D 37/06 141/383 |
| 2007/0039963 A1* | 2/2007 | Krentz | B60K 15/04 220/304 |
| 2012/0103685 A1* | 5/2012 | Blanchard | H02G 3/0431 174/72 A |

(Continued)

FOREIGN PATENT DOCUMENTS

WO WO-2015171716 A1 * 12/2015 ........... B64D 37/005

*Primary Examiner* — Joshua E Rodden
(74) *Attorney, Agent, or Firm* — AFMCLO/JAZ; Richard M. Mescher (57) ABSTRACT

Disclosed is a temporary protective cover for a back shell of a fuel probe wire harness located at a floor within an aircraft for use during inspection and/or maintenance of the aircraft fuel tank. The temporary protective cover includes a protecting portion and a securing portion. The protecting portion includes a body forming a hollow interior space configured to receive the back shell therein, a bottom side with an opening configured for passage of the back shell into and out of the hollow interior space, and a side with an upwardly extending slot therein for passage of the wire harness through the side into the hollow interior space. The bottom side is configured to engage the floor within the fuel tank when the back shell is located within the hollow interior space. The slot has an open lower end for passage of the wire harness vertically into the slot.

9 Claims, 9 Drawing Sheets

(56) References Cited

U.S. PATENT DOCUMENTS

| | | | |
|---|---|---|---|
| 2012/0187131 A1* | 7/2012 | Claucherty | B60K 15/03 220/315 |
| 2013/0193150 A1* | 8/2013 | Keefer | B65D 39/084 220/562 |
| 2017/0009797 A1* | 1/2017 | Rawdon | B64D 37/32 |
| 2018/0244397 A1* | 8/2018 | Carr | B64D 37/02 |
| 2018/0363850 A1* | 12/2018 | Cheatham | F16L 5/08 |
| 2019/0234357 A1* | 8/2019 | Aponte Hernandez | B60K 15/03 |
| 2022/0309738 A1* | 9/2022 | Asai | G06T 15/10 |

\* cited by examiner

TEMPORARY BACK-SHELL COVER FOR AN AIRCRAFT FUEL TANK

Pursuant to 37 C.F.R. § 1.78 (a) (4), this application claims the benefit of and priority to prior filed co-pending Provisional Application Ser. No. 63/585,644, filed Sep. 27, 2023, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to systems, devices, and methods for inspecting and maintaining aircraft fuel tanks and, more particularly, to systems, devices, and methods for preventing damage to aircraft components within the aircraft fuel tanks when inspection and/or maintenance personnel are required to drop into the aircraft fuel tanks.

BACKGROUND OF THE INVENTION

A large percentage of properly inspecting and maintaining aircraft fuel tanks and their associated systems must be performed within an interior of the fuel tanks. Performing necessary inspection and maintenance tasks requires personnel to physically enter the tank, where many environmental hazards exist. These environmental hazards include fire, explosion, toxic and irritating chemicals, oxygen deficiency, and the confined nature of the fuel tank itself. In order to prevent related injuries to the personnel and damage to the aircraft, organizations must develop specific procedures for identifying, controlling, and/or eliminating hazards associated with fuel-tank entry.

Physical characteristics of the fuel tank itself can create hazards and can also exacerbate fire, explosion, and toxicity hazards. Entry into most aircraft fuel tanks is through an access hole often less than two feet (0.6 meters) long and one foot (0.3 meters) wide. Though interior dimensions of aircraft fuel tanks vary considerably, all such fuel tanks have a limited volume. Thus, a relatively small amount of a chemical inside one of these enclosed spaces can create significant levels of flammable and/or toxic vapor.

Personnel performing work within aircraft fuel-tanks also may damage the aircraft if they are not properly trained and equipped to avoid such damage. Such as, for example but not limited to, mating surfaces of the access opening and covers should be protected during entry so that the surfaces are not scratched or otherwise damaged. Also, components located within aircraft fuel tanks such as, for example but not limited to, fuel pumps, fuel-quantity systems, and associated wiring harnesses and conduits, are also vulnerable to damage if they are struck or dislodged. Components that particularly vulnerable are those components located below the access opening where personnel must drop into the aircraft fuel tank. Furthermore, containment properties of the fuel tanks can be compromised if sealant is damaged or dislodged or if fuel-tank bladders are penetrated.

As a result, there is an ongoing desire to continuously improve training and equipment in order to further reduce injury to inspection and maintenance personnel and/or damage to the aircraft. Accordingly, there is a need for improved equipment for protecting components located within aircraft fuel tanks against damage when inspection and maintenance personnel are required to be inside the aircraft fuel tanks.

SUMMARY OF THE INVENTION

The present invention overcomes the foregoing problems and other shortcomings, drawbacks, and challenges of performing inspections and maintenance within aircraft fuel tanks. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a temporary protective cover for a wire harness back shell located at a floor within a fuel tank of an aircraft for use during inspection and/or maintenance of the fuel tank. The temporary protective cover comprises a protecting portion and a securing portion. The protecting portion has body forming a hollow interior space configured to receive the back shell therein, a bottom side with an opening configured for passage of the back shell therethrough into and out of the hollow interior space, and a side with an upwardly extending slot therein for passage of the wire harness through the side into the hollow interior space. The bottom side is configured to engage the floor within the fuel tank when the back shell is located within the hollow interior space. The upwardly extending slot has an open lower end for passage of the wire harness vertically into the slot. The securing portion extends from the protecting portion and is configured to secure the protecting portion over the back shell.

According to another embodiment of the present invention, an aircraft comprises a fuel tank having a top wall with an access opening therein, a bottom wall having bulkhead fitting through which a wire harness passes through, and a back shell for the wire harness at the bulkhead fitting within the fuel tank and a temporary protective cover including a protecting portion and a securing portion extending from the protecting portion. The protecting portion has a body forming a hollow interior space configured to receive the back shell therein, a bottom side with an opening configured for passage of the back shell therethrough into and out of the hollow interior space, and a side with an upwardly extending slot therein for passage of the wire harness through the side into the hollow interior space. The bottom side is configured to engage the floor within the fuel tank when the back shell is located within the hollow interior space. The vertically extending slot includes an open lower end for passage of the wire harness vertically into the slot. The securing portion extends from the protecting portion and is configured to secure the protecting portion over the back shell.

According to yet another embodiment of the present invention, is a method for temporarily protecting a back shell for a fuel probe wire harness located at a floor within a fuel tank of an aircraft during inspection and/or maintenance of the fuel tank. The method comprises the steps of removing a fuel probe from the fuel probe wire harness, installing a temporary protective cover over the back shell, performing inspection and/or maintenance within the fuel tank after the step of installing the temporary protective cover, removing the temporary protective cover from the back shell after the step of performing inspection and/or maintenance, and reinstalling the fuel probe to the fuel probe wire harness. The temporary protective cover comprises a protecting portion and a securing portion extending from the protecting portion and configured to secure the protecting portion over the back shell. The protecting portion has a body forming hollow interior space configured to receive the back shell therein, a bottom side with an opening configured for passage of the back shell therethrough into and out of the hollow interior space, and a side with an upwardly extending slot therein for passage of the wire harness through the side into the hollow interior space. The bottom side is configured to engage the floor within the fuel tank when the back shell is located within the hollow interior space. The slot has an open lower end for passage of the wire harness vertically into the slot.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1A:
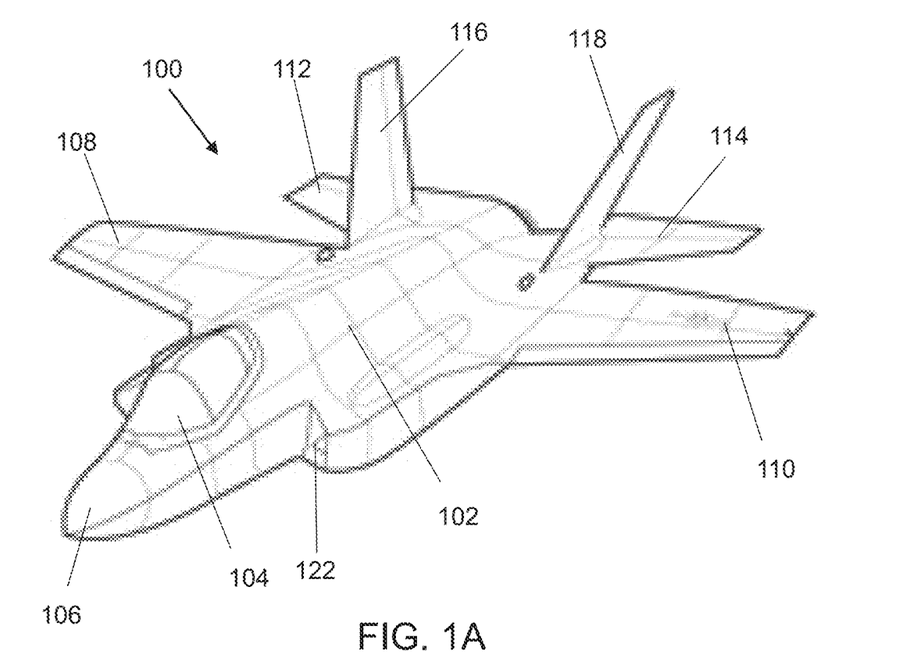
FIG. 1A is a perspective view of an exemplary aircraft.
Figure 1B:
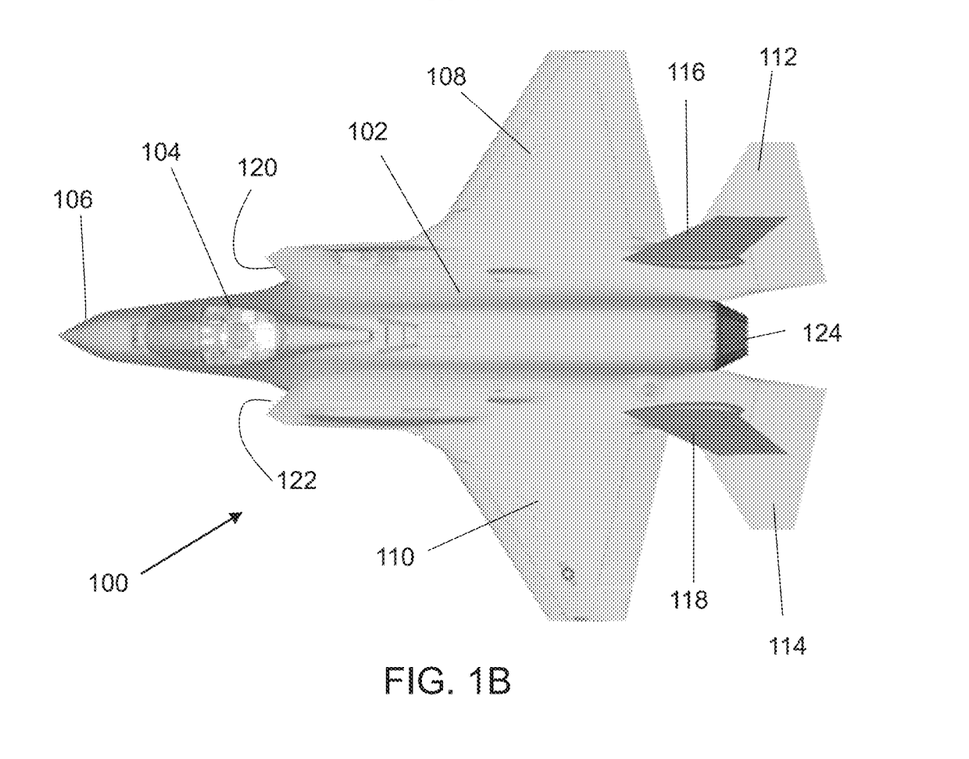
FIG. 1B is a top plan view of the aircraft of FIG. 1.
Figure 1C:
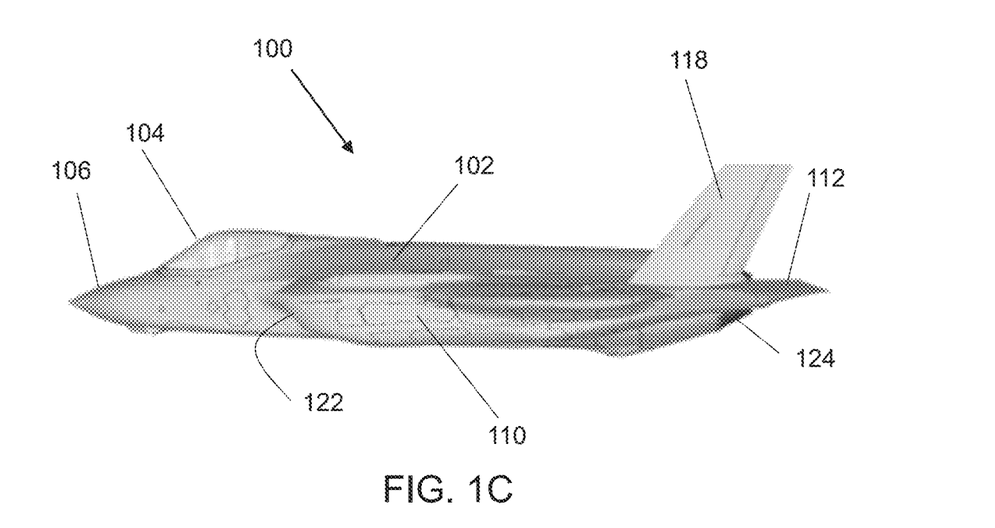
FIG. 1C is left side elevational view of the aircraft of FIGS. 1 and 2.

FIGS. 1A to 1C illustrate an aircraft 100 in an exemplary embodiment of the present invention. The term "aircraft" is used herein to describe a machine or device, such as an airplane, helicopter, glider, dirigible, and the like capable of atmospheric flight. The illustrated aircraft 100 is a F-35 which is a single-seat, single engine, all weather stealth multiple role combat aircraft produced by Lockheed Martin. The aircraft 100 includes a fuselage 102 having a cockpit 104 for a pilot located behind a nose cone 106 of the fuselage 102. Located within the nose cone 106 is an active electronically scanned array (AESA) radar system as well as other sensors. The illustrated aircraft 100 also includes a right and left wings 108, 110 that laterally extend outward from opposed sides of the fuselage 102. Right and left horizontal tail members 112, 114 extend rearward and laterally outward from a rear end of the fuselage 102. The wing-tail configuration includes right and left upward extending and laterally spaced-apart vertical stabilizers 116, 118 that are canted for stealth performance. The single engine is located within the fuselage 102 and is provided with forward facing right and left air inlets 120, 122 located just behind the cockpit 104 and a thrust nozzle 124 located at a tail of the fuselage 102. It is noted that the illustrated aircraft 100 is exemplary of a suitable aircraft for application of the present invention only and the aircraft 100 can alternatively have any other suitable form, purpose, and/or configuration.

Figure 2A:
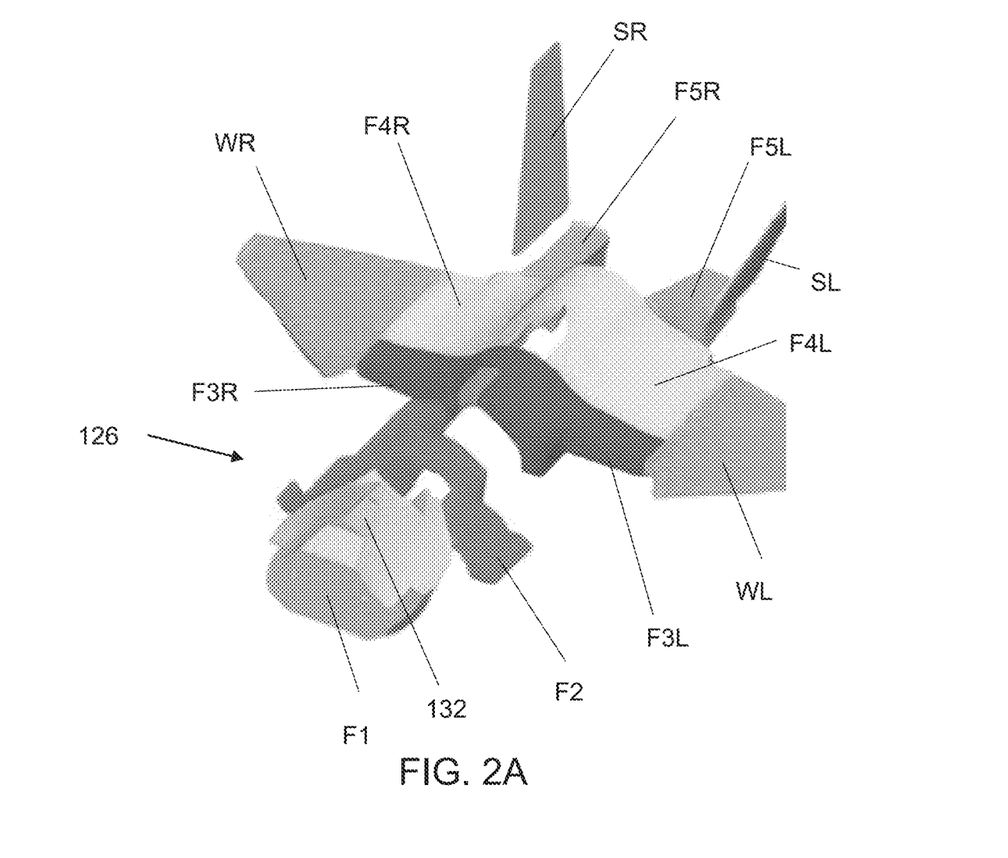
FIG. 2A is a perspective diagrammatic view of internal fuel tanks of the exemplary aircraft of FIGS. 1A to 1C including an F1 fuel tank located behind a cockpit of the exemplary aircraft.
Figure 2B:
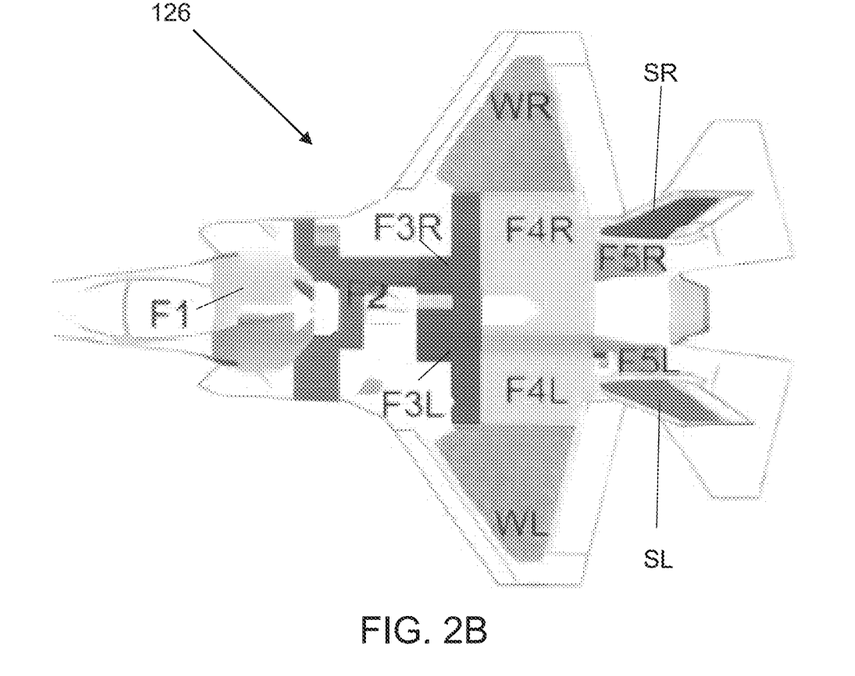
FIG. 2B is a top plan diagrammatic view of the internal fuel tanks of the exemplary aircraft of FIGS. 1A to 1C including the F1 fuel tank located behind the cockpit of the exemplary aircraft.
Figure 2C:
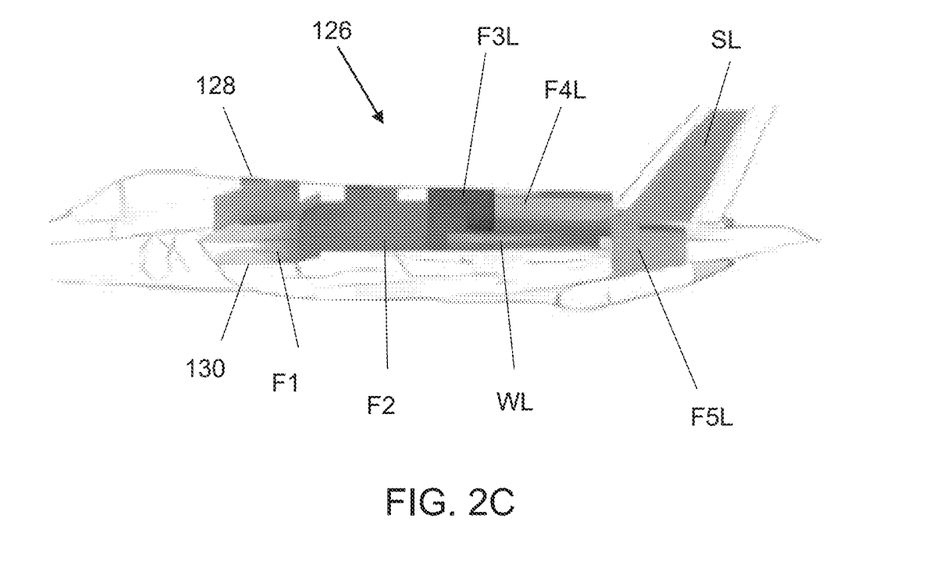
FIG. 2C is a left-side elevational diagrammatic view of the internal fuel tanks of the exemplary aircraft of FIGS. 1A to 1C including the F1 fuel tank located behind the cockpit of the exemplary aircraft.

As best shown in FIGS. 2A to 2C, the illustrated aircraft 100 also includes a plurality of internal fuel tanks 126 located throughout out the aircraft 100. The illustrated fuel tanks 126 are located within the fuselage 102, the right and left wings 108, 110, and the right and left vertical stabilizers 116, 118. Located within the fuselage 102, from front to rear, are a first fuselage tank F1, a second fuselage tank F2, right and left third fuselage tanks F3R, F3L, right and left fourth fuselage tanks F4R, F4L, and right and left fifth fuselage tanks F5R, F5L. Located within the wings 108, 110 are right-wing and left-wing tanks WR, WL. Located within the stabilizers 116, 118 are right-stabilizer and left-stabilizer tanks SR, SL. The first fuselage tank F1 is the main engine feed tank and is located behind the cockpit 104. The first fuselage tank F1 has a hollow interior space or cavity with a depth of about 6 feet between a top wall or ceiling 128 and a bottom wall or floor 130. An access opening or hatch 132 is located in the top wall 128 in order to provide access to the interior of the first fuselage tank F1 to inspection and maintenance personnel. The illustrated access opening 132 is sized about 18 inches by 18 inches. In order to enter the first fuselage tank F1, a technician must lower themselves feet first through the access opening 132 and drop to the floor 130. It is noted that the fuel tanks 126 of the aircraft 100 can alternatively have any other suitable size, quantity, and/or configuration.

Figure 3A:
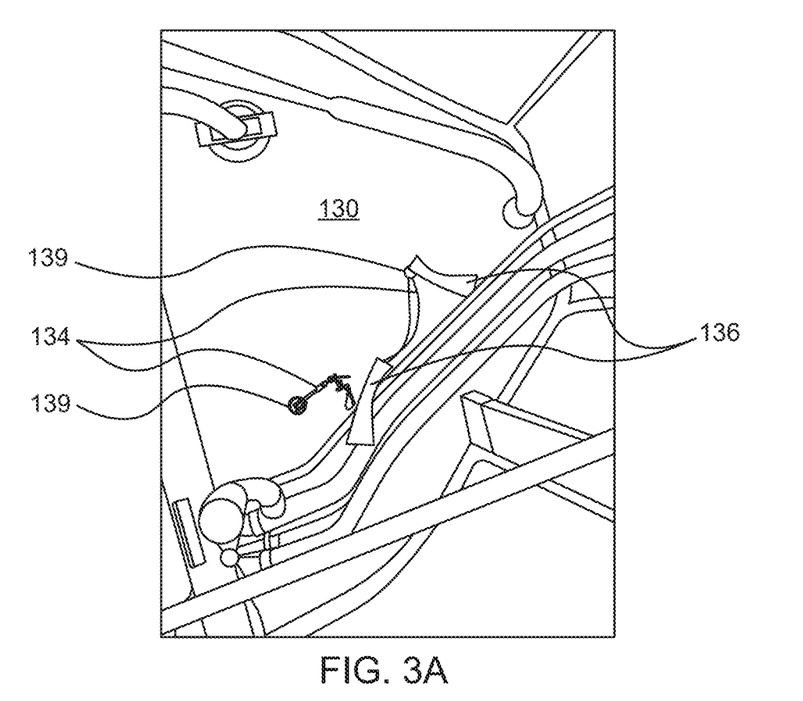
FIG. 3A is a downward view into the F1 fuel tank of the exemplary aircraft of through a top access opening of the F1 fuel tank.
Figure 3B:
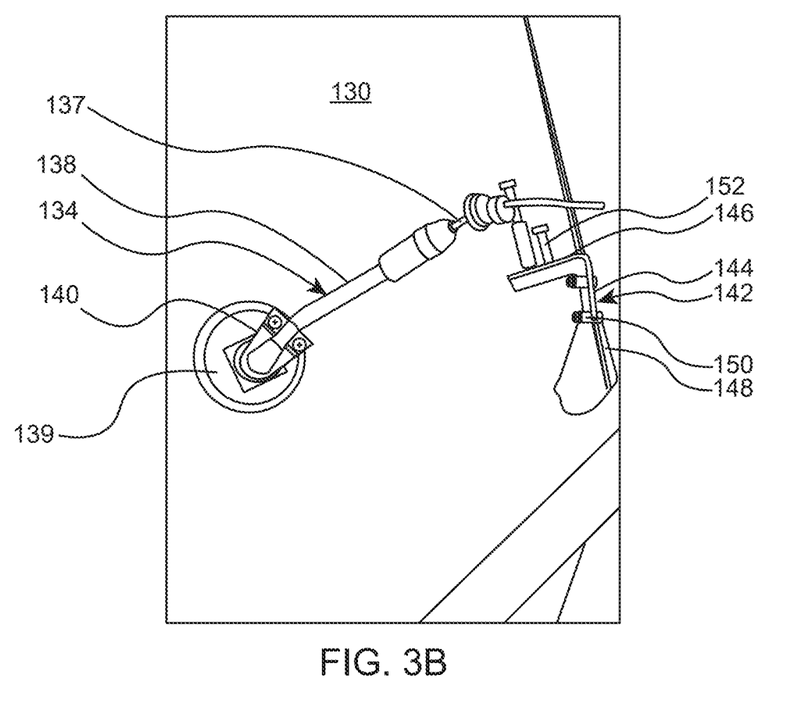
FIG. 3B is an enlarged portion of FIG. 3A showing a wiring harness extending over a bottom wall of the F1 fuel tank below the top access opening of the F1 fuel tank.

FIGS. 3A and 3B show the inside of the first fuselage tank F1 when looking downward toward the floor 130 of the first fuselage tank F1 through the access opening 132. Located at the floor 130 below the access opening 132 are two separate and spaced apart harness assemblies 134 for connecting two fuel level probes 136, which measure the amount of fuel located within the first fuselage tank F1, to aircraft control systems (not shown). Each of the illustrated harness assemblies 134 includes a wire harness 137 at least partially bound and/or protected by a braided sleeve 138. It is noted that any other suitable binding and/or protection means can alternatively be utilized. The term "wire harness", also known as a wiring harness, cable harness, cable assembly, wire assembly, wiring assembly, or wiring loom, is used in this specification and in the claims to mean one or more electrical cables or wires which transmit signals or electrical power and are typically bound together.

The illustrated harness assemblies 134 also include a bulkhead or bulkhead fitting 139 that passes through the floor 130 of the first fuselage tank F1 which enables the wire harness 137 to pass through the floor 130 of the first fuselage tank F1 in a sealed manner. Therefore, when replacing the wire harness 139, extra aircraft down time is needed because access to the opposite end of the wire harness 139 located below the first fuselage tank F1 is low observable (LO) intrusive.

The illustrated harness assemblies 134 further include a back shell 140 located at the bulkhead fitting 139 within the first fuselage tank K1. The term "back shell" is used in this specification and claims to mean a component that attaches to the back of a connector or other structure that is often designed to guide the wires and/or cables and can be mated with strain relief components, environmental seals, shielding etc. if desired. The back shell 140 can be made from metal or any other suitable material and can be attached or molded over the bulkhead fitting 139. The illustrated back shell 140 forms a 90-degree angle in the wire harness 137 so that the wire harness 137 perpendicularly extends through the floor 130- and then turns 90 degrees so that it extends generally parallel along the inner side of the floor 130 within the first fuselage tank K1. The illustrated back shell also includes a clamp secured by mechanical fasteners to secure the wire harness 137 in position. However, the back shell 140 can alternatively have any other suitable configuration. Each wire harness 134 extends within the first fuselage tank F1 from the back shell 140 to a connection with one of the fuel level probes 136.

Also provided within the first fuselage tank F1 are one or more mounting or supporting brackets 142 that are each rigidly connected to the floor 130 of the first fuselage tank F1. The illustrated mounting bracket 142 is generally L-shaped and formed of sheet metal. The illustrated mounting bracket 142 is formed of aluminum but any other suitable material can be utilized. The illustrated mounting bracket 142 includes a first leg or web 144 and a second leg or web 146 with a 90-degree bend therebetween. The first leg 144 of the mounting bracket 142 is rigidly and removably secured to a flange 148 vertically extending from the floor 130 of the first fuselage tank F1 The illustrated first leg 144 is secured to the flange 148 by a plurality of threaded fasteners 150 but it is noted that the mounting bracket 142 can alternatively be secured in any other suitable manner. The second vertically extending leg 146 extends perpendicularly from the flange 148 generally toward the back shell 140 in a cantilevered manner. Fasteners 152 are mounted to the second leg 146 of the mounting bracket 142 for fastening and/or supporting items thereto. It is noted that the mounting bracket 142 can alternatively have any other suitable size and/or configuration.

Figure 4A:
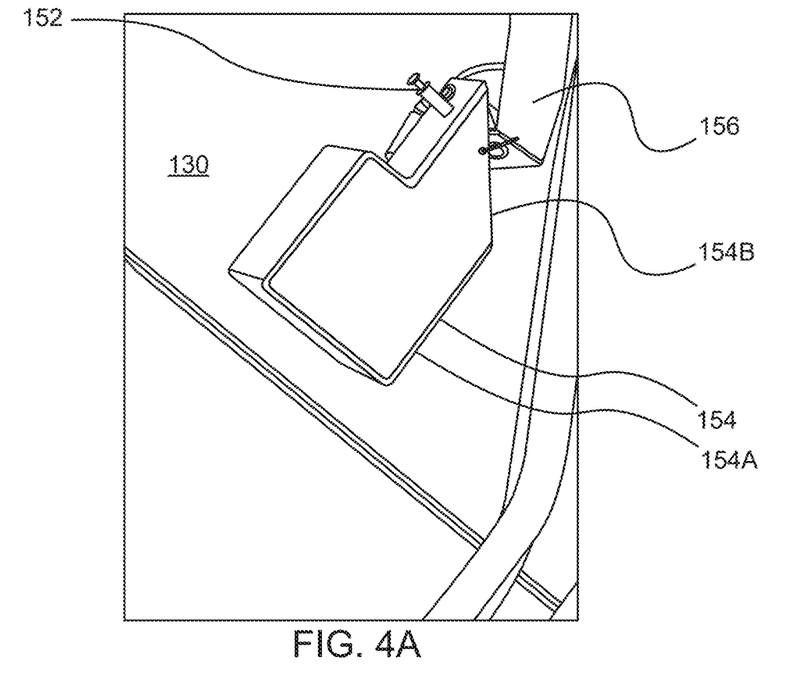
FIG. 4A is a top view of a temporary protective cover installed over the wiring harness of FIGS. 3a and 3B according to the present invention.
Figure 4B:
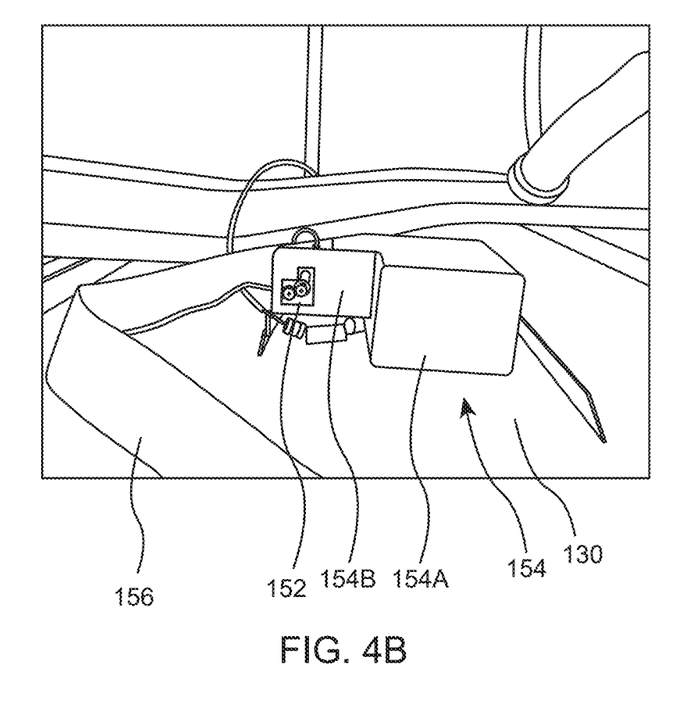
FIG. 4B is a side view of the temporary protective cover installed over the wiring harness of FIGS. 3a and 3B according to the present invention.
Figure 5A:
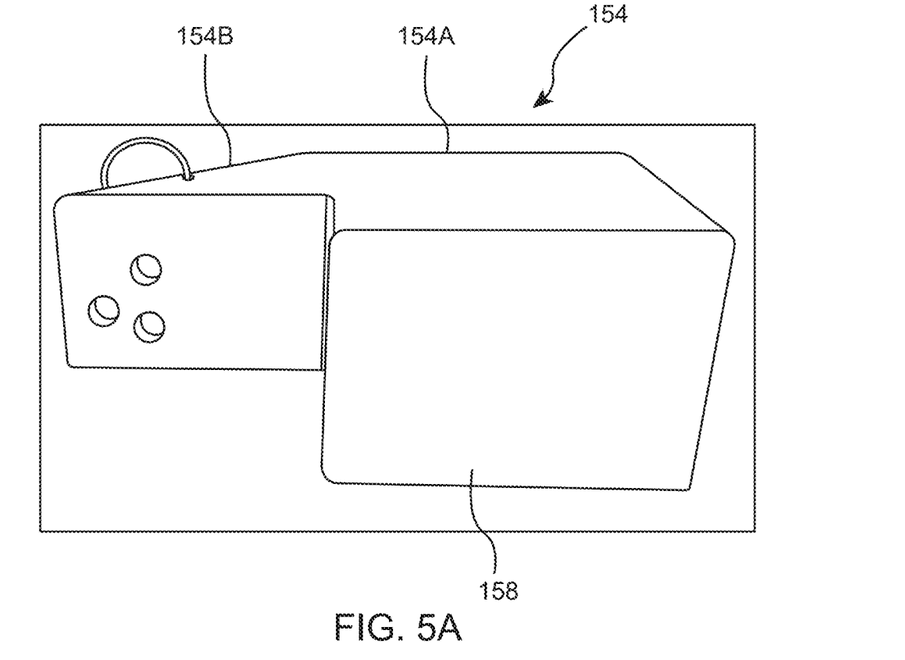
FIG. 5A a top/front perspective view of the temporary protective cover of FIGS. 4A and 4B.
Figure 5B:
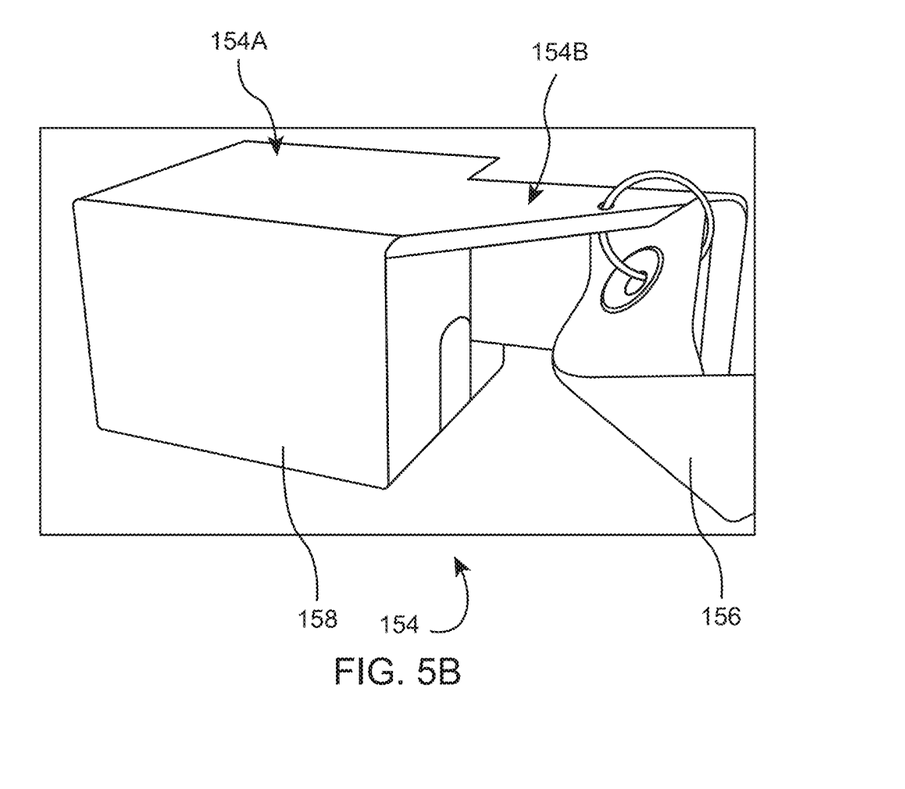
FIG. 5B a top/rear perspective view of the temporary protective cover of FIG. 5A.
Figure 5C:
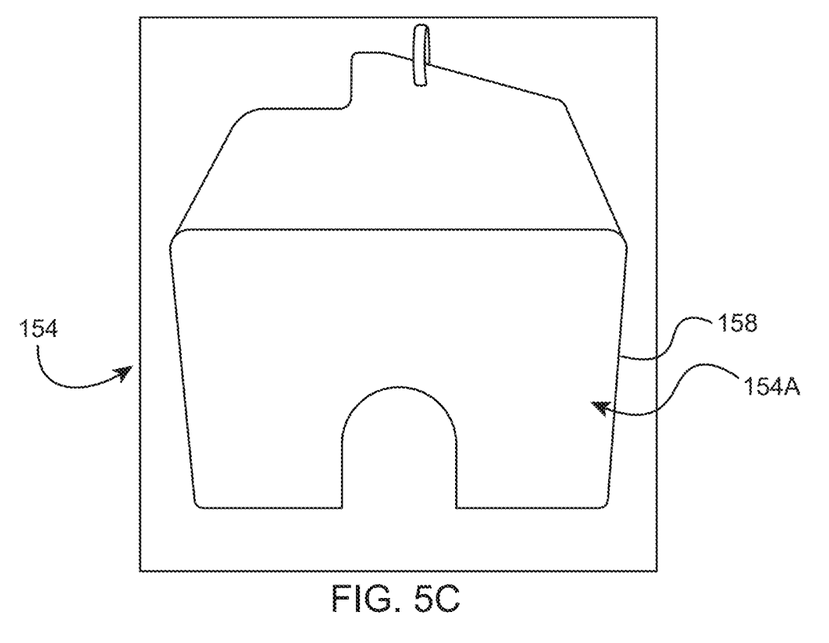
FIG. 5C is top/left-side perspective view of the temporary protective cover of FIGS. 5A and 5B.
Figure 5D:
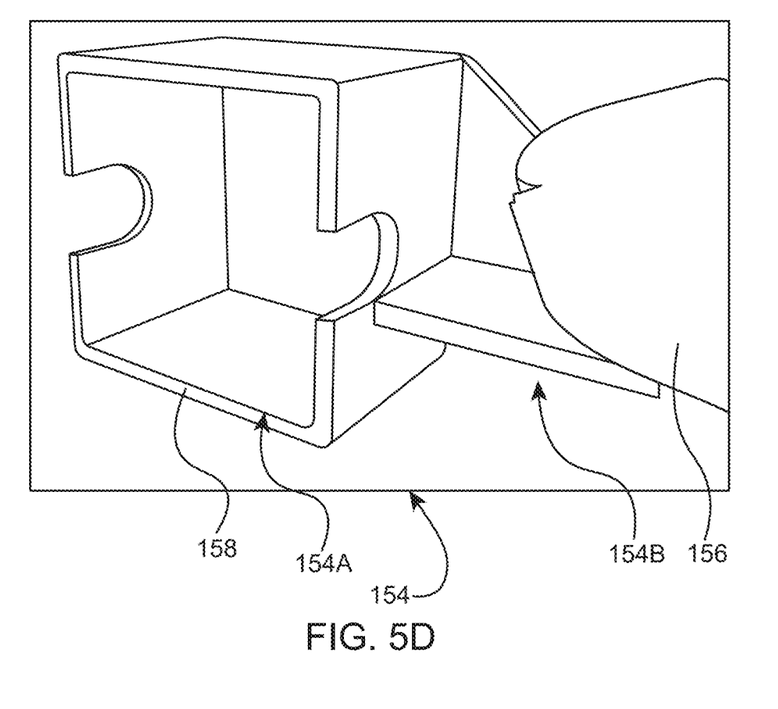
FIG. 5D is a bottom/rear perspective view of the temporary protective cover of FIGS. 5A to 5C.
Figure 5E:
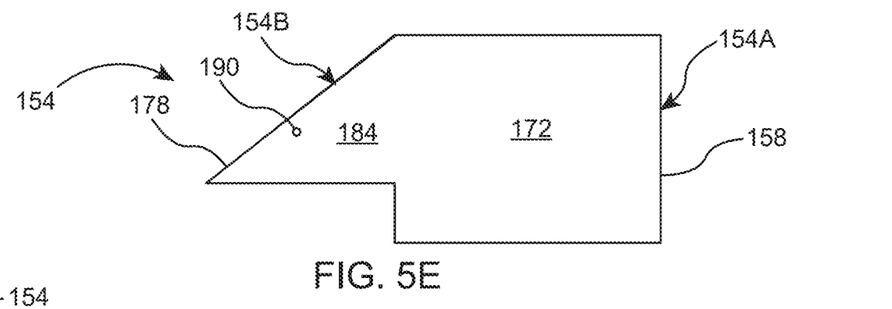
FIG. 5E is a top plan view of the temporary protective cover of FIGS. 5A to 5D.
Figure 5F:
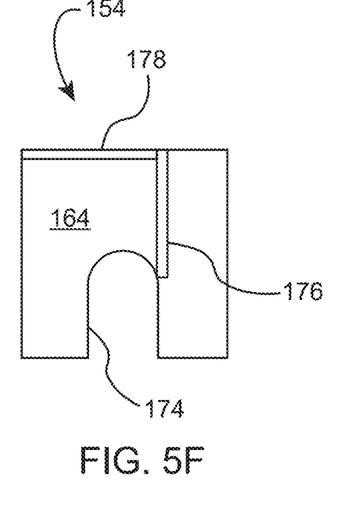
FIG. 5F is a right-side elevational view of the temporary protective cover of FIGS. 5A to 5E.
Figure 5G:
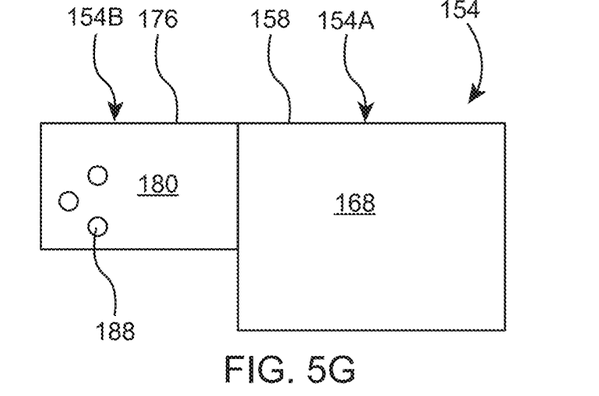
FIG. 5G is a front elevational view of the temporary protective cover of FIGS. 5A to 5F.
Figure 5H:
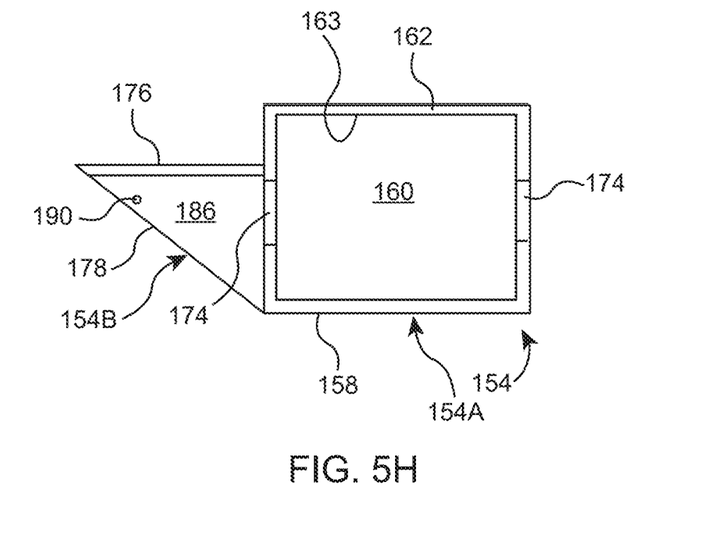
FIG. 5H is a bottom plan view of the temporary protective cover of FIGS. 5A to 5G.
Figure 5I:
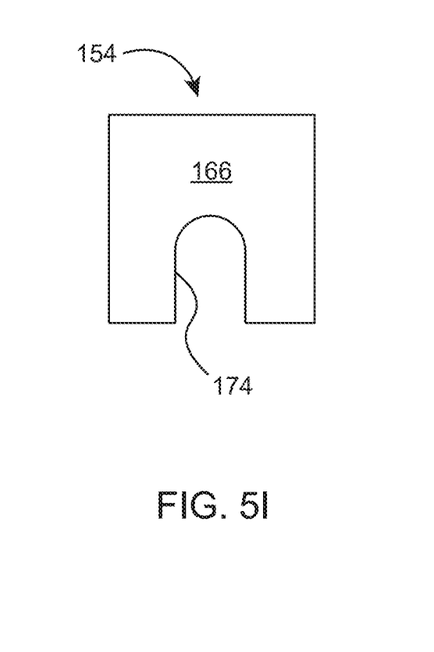
FIG. 5I is a left-side elevational view of the temporary protective cover of FIGS. 5A to 5H.
Figure 5J:
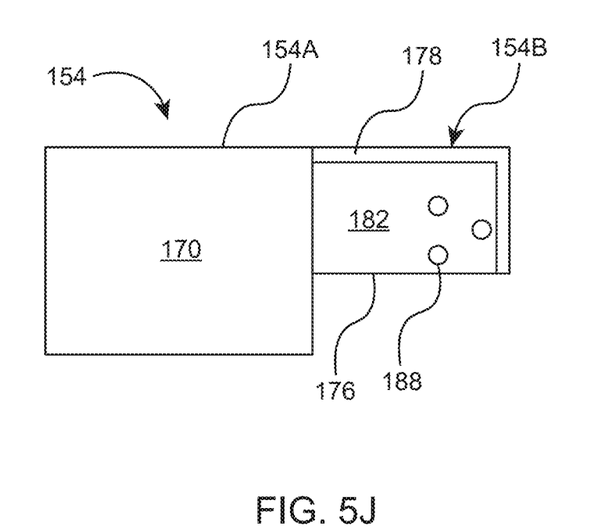
FIG. 5J is a rear elevational view of the temporary protective cover of FIGS. 5A to 5I.

FIGS. 4A and 4B show the harness assembly 134 with a temporary protective cover 154 installed over the bulkhead fitting 139, the back shell 140, and a portion of the wire harness 139 adjacent the back shell 140. The illustrated temporary protective cover 154 includes a protecting portion 154A and a securing portion 154B. The protecting portion 154A is configured to temporarily protect at least the back shell 140 portion of the harness assembly 134 against technicians inadvertently dropping onto it and/or striking or kicking into it while remaining out of the way of inspection and/or maintenance being performed. The illustrated protective portion 154A includes a body sized and shaped to receive and cover the back shell 149 and an open bottom forming a bottom edge to engage the floor 130 about the back shell 140. The illustrated securing portion 154B is configured to secure the protecting portion 154A in place over the back shell 140. The illustrated securing portion 154B temporarily engage the mounting bracket 142 to secure the protecting portion 154A in position over the back shell 140. It is noted that the protecting portion 154A and/or the securing portion 154B can be configured in any other suitable manner.

The illustrated temporary protective cover 154 is also provided with a "Remove Before Flight" Banner 156. The illustrated banner 156 is secured to the temporary protective cover 154 by a wire ring extending through a grommet of the banner 156. It is noted that the banner can alternatively be attached to the temporary protective cover 154 in any other manner. It is also notated that the banner can alternatively have any other suitable configuration or the banner 156 can be eliminated if desired.

FIGS. 5A to 5J illustrate a temporary protective cover 154 having the protecting portion 154A and the securing portion 154B according to an embodiment of the present invention. The illustrated protecting portion includes a body 158 which forms a hollow interior cavity or space 160 and a bottom side or face 162 that forms an opening 163 into the interior cavity 160. The illustrated hollow body 158 is shaped as a square cuboid, also referred to as a right squire prism, because it has right and left sides or faces 164, 166 which are square shaped and front, back, top, and bottom sides or faces 168, 170, 172, 162 which each are rectangular shaped or rectangular frame shaped in the case of the bottom side or face 162. The illustrated right, left, front, back, and top sides or faces 164, 166, 168, 170, 172 are formed by planar walls of substantially constant thickness that are connected at right angles. Thus, the edges and corners of the body 158 are all sharp. It is noted that alternatively one or more of the walls can have a non-constant thickness and/or one or more of the edges and corners can be radiused or rounded if desired. The illustrated bottom side or face 162 is formed by bottom edges of the right, left, front, and back walls and is substantially planar to engage the floor 130 of the first fuselage tank F1 when temporarily installed over the harness assembly 134. Inner sides of the bottom edges of the right, left, front, and back walls form the opening 163 into the interior cavity 190. It is noted that alternatively the bottom side could be partially formed by a bottom wall, one or more flanges, or the like if desired. The illustrated right and left sides or faces 164, 166 are provided with openings 174 sized and shaped for passage of the wire harness 137 through the hollow body 158. The illustrated openings 174 are each centrally located in the forward/rearward direction and are vertically extending slots extending through the bottom edges of the right and left sides or faces 164, 166 so that the hollow body 158 can be lowered over the wire harness 137 such that the wire harness 137 enters the openings 163 through their open lower ends. The upper end of the openings 163 is provided with a radius to provide a hemispherical shape. It is noted that the openings 163 can alternatively have any other suitable size, quantity, shape and/or configuration. The hollow body 158 is sized, shaped, and configured to cover and enclose at least a portion of the harness assembly 134. In the illustrated embodiment, at least the back shell 140 of the harness assembly 134 is covered and enclosed by the hollow body 158. It is noted that the protecting portion 154A can alternatively have any other suitable size, shape and/or configuration.

The illustrated securing portion 154B includes an arm 176 extending rightward from the right face or side 164 of the hollow body 158 and a flange 178 extending rightward from the right face or side 164 of the hollow body 158 and rearward from the arm 176. The illustrated arm 176 is a vertically oriented and rectangularly shaped planar sheet that has a substantially uniform thickness between a front side or face 180 and a rear side or face 182. The illustrated top edge of the arm 180 is a smooth extension of the top side or face 172 of the hollow body 158. The illustrated arm 176 is spaced rearwardly from the front side or face 168 of the hollow body 158 and is located just forward of the front side of the wire harness opening 174. It is noted that the arm 176 can alternatively have any other suitable size, shape, location, and/or configuration. The illustrated flange 178 is a horizontally oriented and triangular shaped planar sheet that has a substantially uniform thickness between a top side or face 184 and a bottom side or face 186. The illustrated top side or face 184 of the flange 178 is a smooth extension of both the top side or face of the hollow body 158 and the top edge of the arm 176. The illustrated flange extends the full length of the arm 176 from the hollow body 158 to the rightward. The illustrated flange 178 has a width that extends from the arm 176 to the back side or face 170 of the hollow body 158 at its leftward end and the width linearly reduces in the rightward direction until the flange 178 has no width at the rightward end of both the arm 176 and the flange. It is noted that the flange 178 can alternatively have any other suitable size, shape, location, and/or configuration.

The illustrated arm 176 is configured cooperate with the mounting bracket 142 within the first fuselage tank F1 to secure the hollow body 158 in its desired position. Specifically, the illustrated arm 176 is configured to be positioned parallel to and adjunct the second leg 146 of the mounting bracket 142 so that fastener openings 188 in the arm 176 are aligned with the fasteners 152 in the second leg 146 of the mounting bracket 142 so that they can receive the fasteners 152 to secure the arm 176 to the mounting bracket 142. The illustrated arm 176 has three fastener openings 188 in a triangular pattern to match the mounting bracket 142. It is noted that the arm 176 can alternatively have any other suitable quantity and/or configuration of fastener openings 188. The illustrated flange 178 is provided with an opening or through hole 190 for cooperating with the wire ring of the banner 156 to secure the banner 156 to the flange 178. The illustrated opening 190 is located near the rightward end of the flange 178 but the opening 190 can alternatively be located at any other location on the flange, the arm 176, or the temporary protective cover 154. Banner opening. It is noted that the supporting portion 154B can alternatively have any other suitable size, shape and/or configuration.

Preferably, the temporary protective cover 154 is a unitary component that comprises a plastic material. The term "unitary component" is used herein and in the claims to mean a component having the character of a unit that is not dividable such as, for example but not limited to, a molded component. More preferably, the temporary protective cover 154 comprises a plastic material which fails prior to a component of the aircraft when over loaded. For example, but not limited to, the temporary protective cover 154 fails prior to the aluminum mounting bracket 154 to which the temporary protective cover 154 is secured when over loaded. Even more preferably, the temporary protective cover comprises ASA (acrylonitrile styrene acrylate). When testing a temporary protective cover 154 comprising ASA, it failed prior to failure of the aluminum mounting bracket 142 when the temporary protective cover was accidentally kicked with excessive force, but it prevented damage to any aircraft components and did not interfere with the work of the inspection and/or maintenance personnel. It is noted that the temporary protective cover 154 can alternatively comprise any other suitable material.

Preferably, the temporary protective cover 154 is formed by any of a variety of 3D printing or additive manufacturing processes. It is noted, however, that the temporary protective cover 154 can alternatively be manufactured by any other suitable manufacturing process.

When the fuel tank F1 is to be inspected and/or maintenance is to be performed, personnel enter the fuel tank F1 through the access opening 132 feet first and drop to the floor 130 while trying to avoid dropping onto any of one or probe probe harness back shells 140 located therein. For the primary fuel tank F1 of the illustrated F-35 aircraft 100, two probe harness back shells 140 are mounted directly underneath the access opening 132 for the fuel tank F1 (best shown in FIGS. 3A and 3B). Initially, each fuel level probe 136 is removed. Then each temporary protective cover 154 is temporarily installed by placing the protecting portion 154A of the temporary protective cover 154 over the back shell 140 such that the bottom side or face 162 of the protecting portion 154A engages the floor 130 of the fuel tank F1. The wire harness 137 extending from the back shell 140 passes through one of the wire openings 174 in the protecting portion 154A. The securing portion 154 of each temporary protective cover 154 is then secured to hold the protecting portion 154A in its desired location. In the illustrated embodiment, the securing portion 154B is secured to the associated mounting bracket 142 with fasteners 152. The fasteners 152 can be threaded fasteners, quick release fasteners, or any other suitable type of fasteners. Inspection and/or maintenance procedures are then be performed by appropriate personnel. Once the inspection and maintenance procedures are complete, the securing portion 154 of each temporary protective cover 154 is disconnected from the associated mounting bracket 142. With the securing portion 154 of the temporary protective cover 154 disconnected from the mounting bracket 142, The protecting portion 154A of each temporary protective cover 154 is lifted up off of the floor 130 so that the protecting portion 154A is no longer covers the back shell 140. With Each temporary protective cover 154 removed, each fuel level probe 136 is reinstalled. Each temporary protective cover 154 is then removed from the fuel tank F1 along with the inspection and/or maintenance personnel.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

It should be understood that every maximum numerical limitation used herein includes every lower numerical limitation, as if such lower numerical limitations were expressly written herein. Every minimum numerical limitation used herein includes every higher numerical limitation, as if such higher numerical limitations were expressly written herein. Every numerical range herein includes every narrower numerical range that falls within such broader numerical range, as if such narrower numerical ranges were all expressly written herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An aircraft comprising:
a fuel tank includes a top wall with an access opening therein, a bottom wall having bulkhead fitting through which a wire harness passes through, and a back shell for the wire harness at the bulkhead fitting within the fuel tank;
a temporary protective cover including a protecting portion and a securing portion extending from the protecting portion;
wherein the protecting portion has a body forming a hollow interior space configured to receive the back shell therein, a bottom side with an opening configured for passage of the back shell therethrough into and out of the hollow interior space, and a side with an upwardly extending slot therein for passage of the wire harness through the side into the hollow interior space;
wherein the bottom side is configured to engage the floor within the fuel tank when the back shell is located within the hollow interior space,
wherein the upwardly extending slot has an open lower end for passage of the wire harness vertically into the slot; and
wherein the securing portion extends from the protecting portion and is configured to secure the protecting portion over the back shell.

2. The protective cover of claim 1, wherein the protecting portion has a planar top side.

3. The protective cover of claim 1, wherein the protecting portion is shaped as a square cuboid.

4. The protective cover of claim 3, wherein the side with the upwardly extending slot for passage of the wire harness through is located on a right side of the protecting portion and another upwardly extending slot for passage of the wire harness through is located on a left side of the protecting portion.

5. The protective cover of claim 4, wherein the securing portion is a vertically oriented planar flange extending from the right side of the protecting portion adjacent the upwardly extending slot and having at least one fastener opening therein.

6. The protective cover of claim 1, wherein the securing portion is a vertically oriented planar flange extending from the side of the protecting portion adjacent the upwardly extending slot and having at least one fastener opening therein.

7. The protective cover of claim 1, wherein the protective portion and the securing portion are a unitary component formed of plastic.

8. The protective cover of claim 7, wherein the plastic of the protective portion and the securing portion each comprise acrylonitrile styrene acrylate.

9. The protective cover of claim 1, wherein the aircraft is an F-35.

\* \* \* \* \*